(12) United States Patent
McClendon et al.

(10) Patent No.: US 10,662,864 B2
(45) Date of Patent: May 26, 2020

(54) INTERNAL COMBUSTION ENGINE WITH SHROUDED INJECTION VALVE AND PRECOMBUSTION CHAMBER SYSTEM

(71) Applicant: GE Oil & Gas Compression Systems, LLC, Houston, TX (US)

(72) Inventors: Gene McClendon, Oklahoma City, OK (US); Randall A. Coleman, Oklahoma City, OK (US)

(*) Notice: Subject to any disclaimer, the term of this patent is extended or adjusted under 35 U.S.C. 154(b) by 96 days.

(21) Appl. No.: 15/907,679

(22) Filed: Feb. 28, 2018

(65) Prior Publication Data

US 2018/0187590 A1   Jul. 5, 2018

Related U.S. Application Data

(63) Continuation of application No. 12/867,248, filed as application No. PCT/US2009/035771 on Mar. 2, 2009, now Pat. No. 9,938,886.

(60) Provisional application No. 61/036,059, filed on Mar. 12, 2008.

(51) Int. Cl.

| | | |
|---|---|---|
| F02B 19/00 | (2006.01) | |
| F02B 19/08 | (2006.01) | |
| F02B 19/10 | (2006.01) | |
| F02B 19/12 | (2006.01) | |
| F02B 19/18 | (2006.01) | |
| F02B 25/14 | (2006.01) | |
| F02B 75/02 | (2006.01) | |

(52) U.S. Cl.
CPC ............ *F02B 19/08* (2013.01); *F02B 19/108* (2013.01); *F02B 19/1014* (2013.01); *F02B 19/109* (2013.01); *F02B 19/12* (2013.01); *F02B 19/18* (2013.01); *F02B 25/14* (2013.01); *F02B 2075/025* (2013.01); *Y02T 10/125* (2013.01)

(58) Field of Classification Search
CPC .... Y02T 10/125; F02B 19/08; F02B 19/1014; F02B 19/108
USPC ........ 123/261, 265, 266, 267, 275, 281, 282, 123/284, 285, 286, 288, 291, 293
See application file for complete search history.

(56) References Cited

U.S. PATENT DOCUMENTS

| | | |
|---|---|---|
| 1,660,424 A | 2/1928 | Modersohn |
| 2,622,570 A | 12/1952 | Nallinger |
| 2,761,431 A | 9/1956 | Nallinger |
| 3,682,146 A | 8/1972 | Mozokhin et al. |

(Continued)

FOREIGN PATENT DOCUMENTS

| | | |
|---|---|---|
| CA | 2196234 A1 | 8/1997 |
| DE | 3709976 A1 | 10/1988 |

(Continued)

OTHER PUBLICATIONS

PCT International Search Report and Written Opinion for PCTUS2009/035771, dated Jul. 15, 2009.

(Continued)

*Primary Examiner* — Hai H Huynh
*Assistant Examiner* — Gonzalo Laguarda
(74) *Attorney, Agent, or Firm* — Benesch, Friedlander, Coplan & Aronoff LLP

(57) ABSTRACT

An engine is provided. In one embodiment, the engine includes a precombustion chamber having a body, a secondary combustion chamber disposed at least partially in the body, and a plurality of passages configured to place the precombustion chamber in fluid communication with a main combustion chamber.

7 Claims, 8 Drawing Sheets

(56) References Cited

U.S. PATENT DOCUMENTS

| | | | |
|---|---|---|---|
| 3,738,333 A | 6/1973 | Vogelsang | |
| 4,022,168 A | 5/1977 | Sprague | |
| 4,091,772 A | 5/1978 | Heater et al. | |
| 4,215,657 A | 8/1980 | Burgio | |
| 4,224,902 A | 9/1980 | Binder et al. | |
| 4,332,223 A * | 6/1982 | Dalton | F02B 19/108 123/143 B |
| 4,370,150 A * | 1/1983 | Fenstermaker | B01D 53/22 95/49 |
| 4,401,072 A * | 8/1983 | Ito | F02B 19/02 123/256 |
| 4,545,344 A | 10/1985 | Matuo | |
| 4,892,070 A * | 1/1990 | Kuhnert | F02B 19/1066 123/266 |
| 5,555,867 A | 9/1996 | Freen | |
| 5,791,374 A | 8/1998 | Black et al. | |
| 7,082,751 B2 * | 8/2006 | McCulloch | F01N 3/0842 417/364 |
| 7,584,739 B2 | 9/2009 | Takahashi et al. | |
| 9,938,886 B2 | 4/2018 | McClendon | |
| 2010/0232985 A1 * | 9/2010 | Jensvold | B01D 53/22 417/53 |

FOREIGN PATENT DOCUMENTS

| | | |
|---|---|---|
| DE | 3913665 A1 | 10/1990 |
| GB | 448739 A | 6/1936 |
| WO | 9628647 A1 | 9/1996 |

OTHER PUBLICATIONS

Bourn et al.; "Advanced Compressor Engine Controls to Enhance Operation, Reliability and Integrity;" Southwest Institute; Mar. 2004.

* cited by examiner

INTERNAL COMBUSTION ENGINE WITH SHROUDED INJECTION VALVE AND PRECOMBUSTION CHAMBER SYSTEM

CROSS REFERENCE TO RELATED APPLICATIONS

This application claims priority to U.S. patent application Ser. No. 12/867,248, entitled "Internal Combustion Engine with Shrouded Injection Valve and PreCombustion Chamber System," filed on Aug. 11, 2010, which is herein incorporated by reference in its entirety, and which claims priority to PCT Patent Application No. PCT/US2009/035771, entitled "Internal Combustion Engine with Shrouded Injection Valve and PreCombustion Chamber System," filed Mar. 2, 2009, which is herein incorporated by reference in its entirety, and which claims priority to and benefit of U.S. Provisional Patent Application No. 61/036,059, entitled "Combustion Engine with Pre-Combustion Chamber," filed on Mar. 12, 2008, which is herein incorporated by reference in its entirety.

FIELD OF THE INVENTION

The present invention relates generally to internal combustion engines. More particularly, the present invention relates to a system consisting of a main chamber and a prechamber configuration for combustion engines.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Certain conventional engines may not meet recently-promulgated environmental regulations. Government agencies are enforcing increasingly stringent limits on engine emissions and efficiency. Starting in 2008, the United States Environmental Protection Agency will further restrict the levels of nitrogen oxides (NOx), carbon monoxide (CO), and non-methane, non-ethane hydrocarbons (NMNEHC) that can be emitted by certain types of two-stroke combustion engines. Consequently, there is a market for two-stroke engines with lower emissions and higher efficiency than conventional designs.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components.

Figure 1:
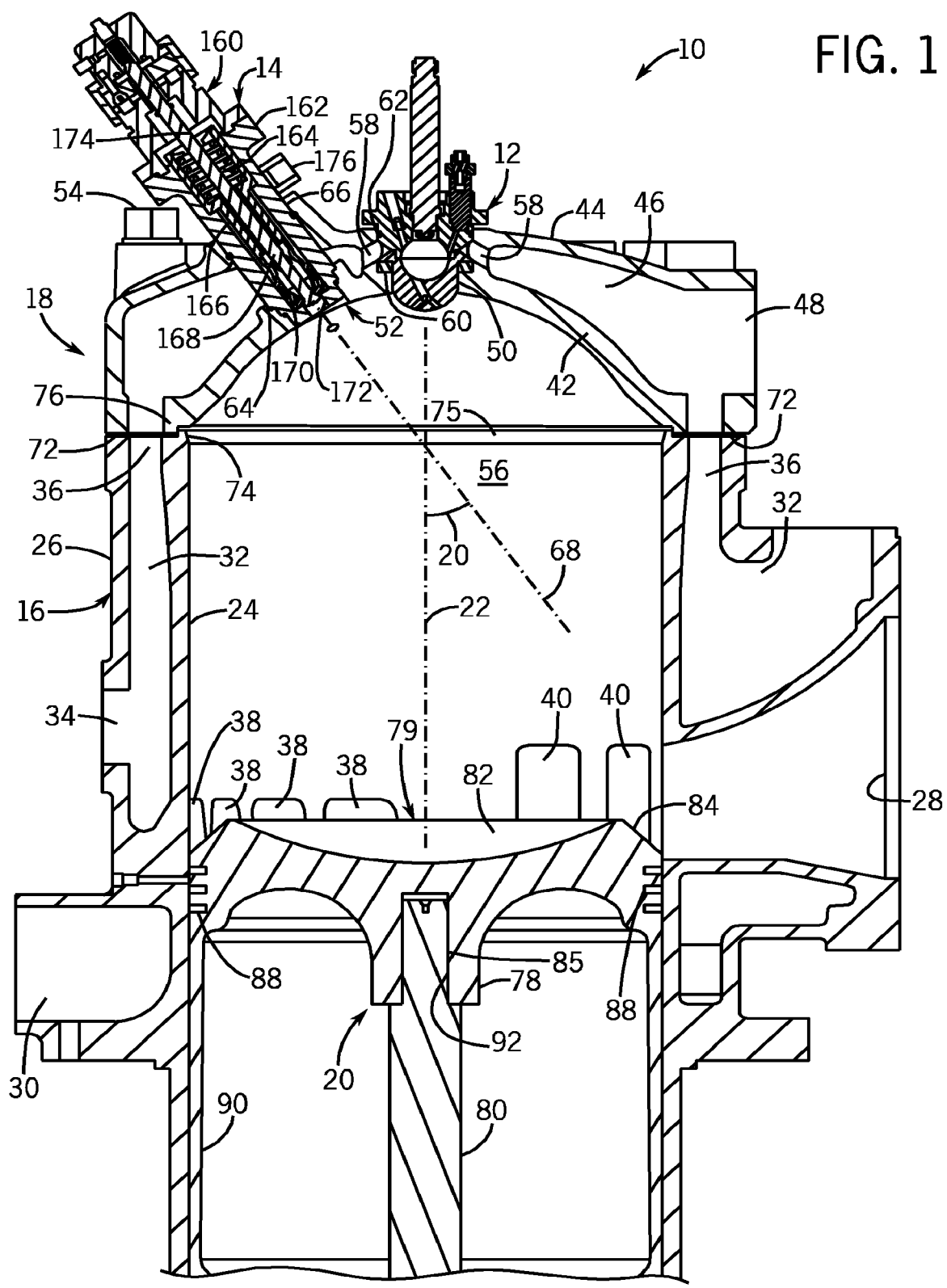
FIG. 1 is a cross-section view of a two-stroke engine in accordance with an embodiment of the present technique.

FIG. 1 illustrates an example of an engine 10 in accordance with embodiments of the present technique. The engine 10 includes a precombustion chamber 12 and a gas injection valve 14 that are believed to improve the efficiency and lower the pollutant emissions of the engine 10 by working together as a system to achieve: (1) deep fuel penetration into the main chamber, (2) improved air/fuel mixing in the main chamber, and (3) improved combustion because of the precombustion chamber's shape, nozzle configuration, and orientation, among other things. Though the present technique is not limited to embodiments that offer these advantages. These devices 12 and 14 are described in detail below, after describing other features of the engine 10.

In this embodiment, the engine 10 includes a cylinder 16, a head 18, and a piston assembly 20. The illustrated cylinder 16 is generally concentric about a central axis 22 and includes an inner sidewall 24, an outer sidewall 26, an exhaust outlet 28, and an air inlet 30. The inner sidewall 24 and the outer sidewall 26 are spaced away from each other and together define a cavity 32 for circulating coolant around the inner sidewall 24 and cooling the engine 10. Coolant may flow into or out of the cavity 32 through an aperture 34 in the outer sidewall 26. The cavity 32 may also include a plurality of apertures 36 that place the cavity 32 in fluid communication with portions of the head 18, as described below. The inner sidewall 24 is penetrated by a plurality of passages 38 that converge in the air inlet 30 and a plurality of passages 40 that converge in the exhaust outlet 28. The passages 40 may extend closer to the head 18 than the passages 38 to increase the portion of the piston's stroke during which exhaust gas may flow through the passages 40 relative to the portion of the piston's stroke during which air may flow in through the passages 38. During a down stroke, exhaust gas may first flow out through the passages 40 before air flows into the cylinder 16 through the passages 38 and purges the remaining exhaust. In some embodiments, the cylinder 16 has a bore (diameter) between 10 and 20 inches, e.g., between 14 and 18 inches.

The cylinder 16 couples to the head 18, which also has a shape that is generally concentric about the central axis 22. In this embodiment, the head 18 includes an inner wall 42, an outer wall 44, a cavity 46, a coolant inlet 48, a precombustion chamber aperture 50, a gas injection valve aperture 52, and bolts 54. One side of the inner wall 42 defines a generally dome-shaped portion of a main combustion chamber 56, and the space between the inner wall 42 and the outer wall 44 generally defines the cavity 46.

In this embodiment, the cavity 46 is in fluid communication with the coolant inlet 48 and with the coolant outlet 34 through both the apertures 36 and the cavity 32 in the cylinder 16. In some embodiments, the flow may be reversed and inlet 48 may be an outlet. The illustrated cavity 46 includes a plurality of passages 58 that extended to the precombustion chamber 12 for cooling the precombustion chamber 12. A portion of the cavity 46 also surrounds a part of the gas injection valve 14.

The illustrated precombustion chamber aperture 50 is generally centrally located at the top of the head 18 and is generally concentric about the central axis 22. As explained below, positioning the precombustion chamber 12 generally centrally above the main combustion chamber 56 is believed to contribute to a more even propagation of a flame throughout the main combustion chamber 56 and improve engine efficiency. In other embodiments, though, the precombustion chamber 12 and the precombustion chamber aperture 50 may be located elsewhere on the head 18 or the engine 10, e.g., to the side of the central axis 22 similar to the gas injection valve 14. The precombustion chamber aperture 50 extends between the main combustion chamber 56 and the exterior of the head 18, and it includes a shoulder 60 and a sidewall 62 that abut seals on the precombustion chamber 12, as described below. The shoulder 60 and the sidewall 62 may be generally concentric about the central axis 22.

The gas injection valve aperture 52 includes a lower aperture 64 and an upper aperture 66 that extend through the inner wall 42 and the outer wall 44, respectively. These apertures 64 and 66 may also be generally circular and generally concentric about a secondary axis 68. The secondary axis 68 may be at an angle 70 with respect to the central axis 22. In some embodiments, the angle 70 may be between 5 and 85 degrees, e.g., between 15 and 45 degrees. In other embodiments, the gas injection valve 14 and the gas injection valve aperture 52 may be generally centrally located along the central axis 22, and the precombustion chamber 12 may be shifted to the side.

The illustrated bolts 54 extend through the head 18 and thread to the cylinder 16, biasing the head 18 against the cylinder 16. A gasket 72 may be positioned between the head 18 and the cylinder 16, such that it is compressed by the bolts 54. In this embodiment, the head 18 and the cylinder 16 include overlapping flanges 74 and 76. The illustrated flange 74 includes a fillet 75 on the side facing the main combustion chamber 56.

Figure 7:
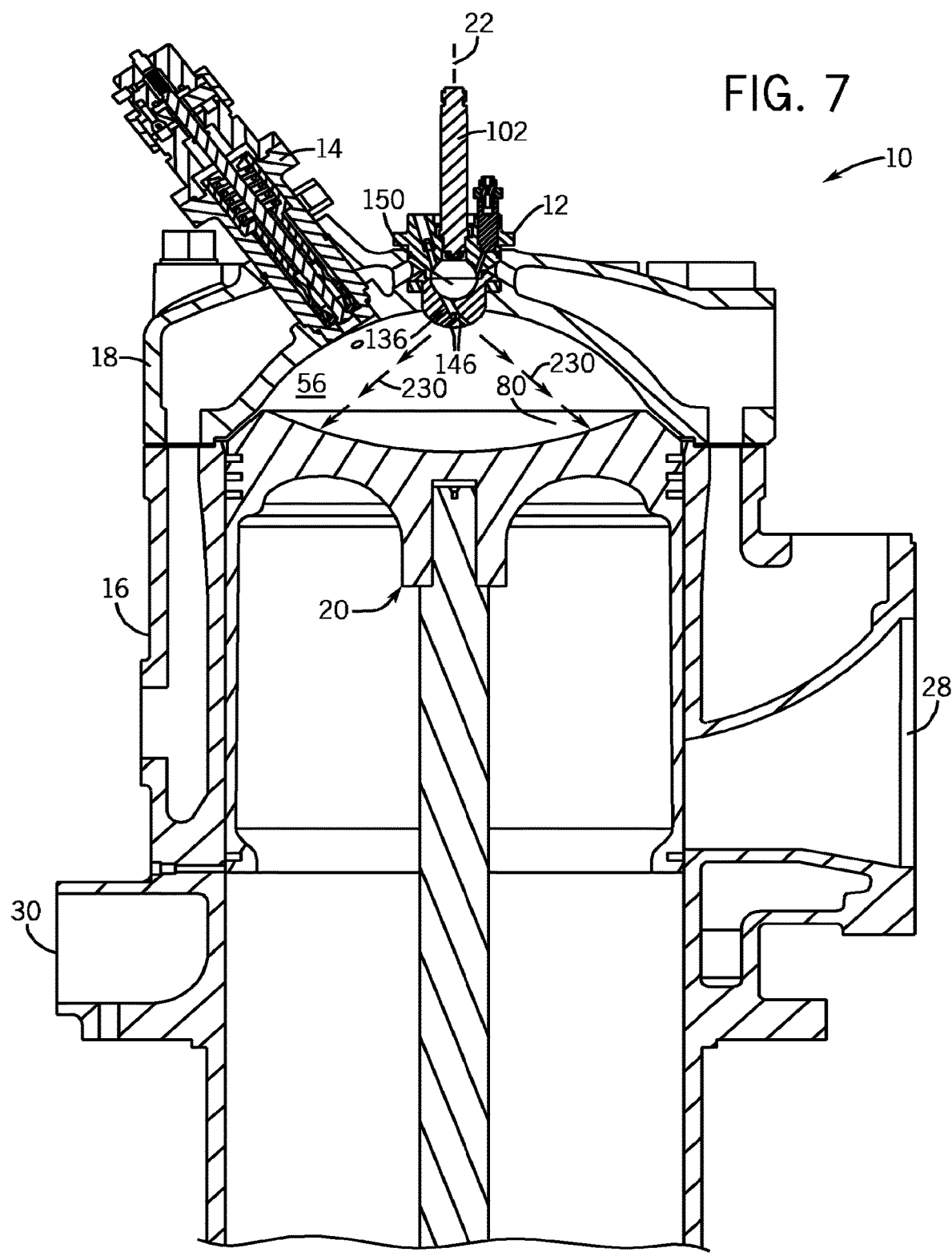
FIG. 7 illustrates the engine of FIG. 1 during ignition.

The piston assembly 20 includes a piston 78 and a shaft 80. In some embodiments, the piston 78 includes a crown 79 with a generally dome-shaped portion 82 and a chamfered portion 84, an aperture 85, a plurality of seals 88, and a sleeve 90. The illustrated piston assembly 20 is generally concentric about the central axis 22. The dome-shaped portion 82 of the crown 79 generally defines a segment of a sphere, and the chamfer 84 generally defines a frustoconical volume. The piston 78 is illustrated at or near one end of its stroke, referred to as a bottom dead center. In this position, both the passages 38 and the passages 40 are in fluid communication with the main combustion chamber 56. The aperture 85 includes internal threads that are complementary to external threads on a distal portion 92 of the shaft 80. The illustrated piston assembly 20 includes three piston ring seals 88 that are disposed above the sleeve 90 and below the chamfer 84. Other embodiments may include more or fewer seals 88 or other types of seals. The sleeve 90 is a generally tubular member that is generally concentric about the central axis 22. The sleeve 90 extends a distance along the cylinder 16 such that the passages 38 and 40 are obstructed by the sleeve 90 when the piston assembly 20 is at the other end of its stroke referred to as top dead center, as illustrated by FIG. 7. In some embodiments, the sleeve 90 may be longer than or generally equal to the length of the stroke of the piston assembly 20.

Figure 2:
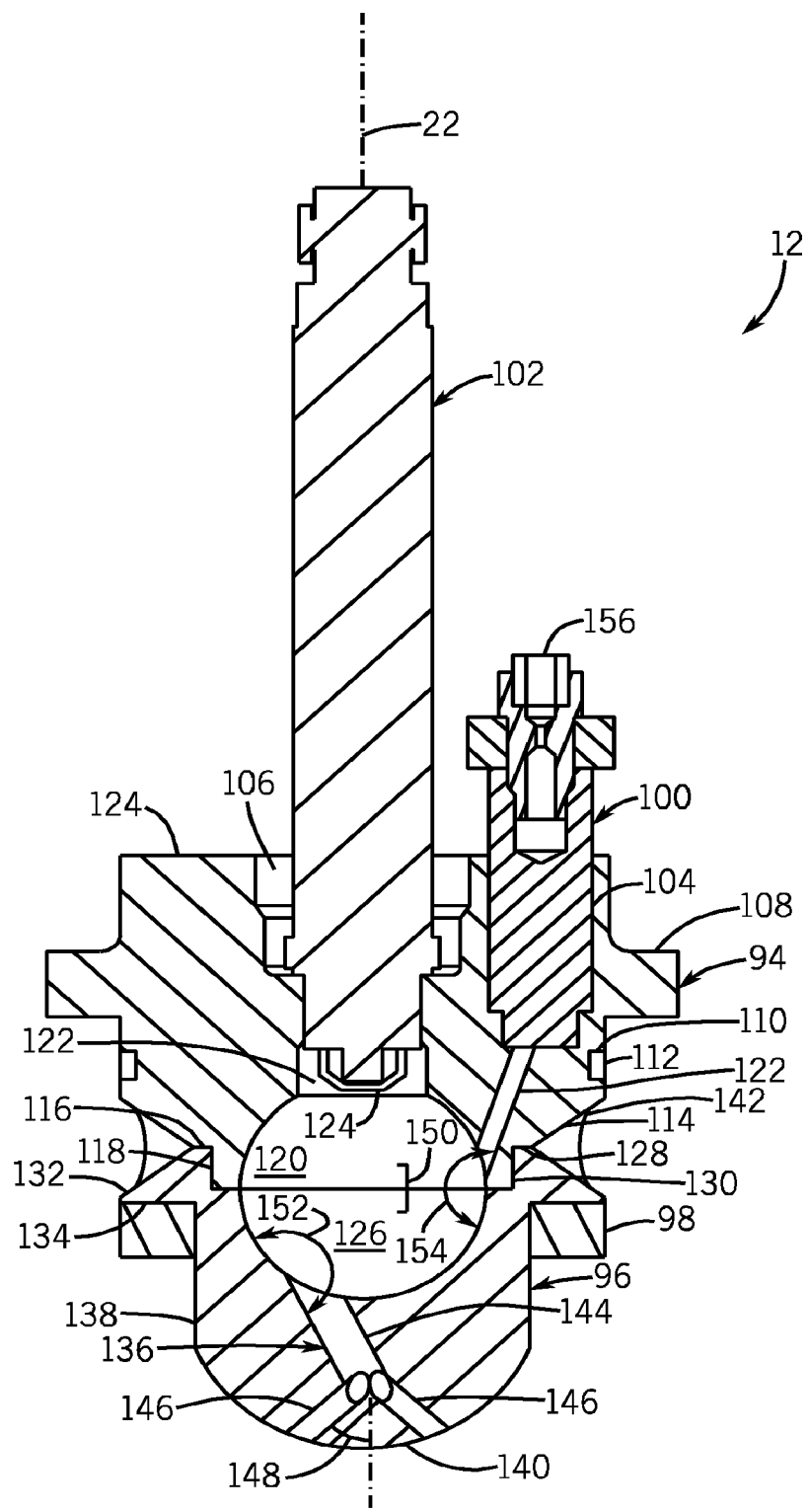
FIG. 2 is a cross-section view of a precombustion chamber in the engine of FIG. 1.

FIG. 2 illustrates an embodiment of the precombustion chamber 12 in greater detail. In this embodiment, the precombustion chamber 12 includes an upper body 94, a lower body 96, a seal 98, a fuel valve 100, and a sparkplug 102. The upper body 94 includes apertures 104 and 106 for receiving the fuel valve 130 and the sparkplug 102, respectively. The upper body 94 also includes a flange 108, a recess 110, a seal 112 disposed in the recess 110, a chamfer 114, a shoulder 116, a flange 118, an upper cavity 120, and a passage 122. The illustrated apertures 104 and 106 extend from a top surface 124 of the precombustion chamber 12 and are formed by generally right circular-cylindrical segments that are coaxial. The apertures 104 and 106 may include internal threads for coupling to external threads on the fuel valve 100 and the sparkplug 102. In this embodiment, the aperture 106 is generally concentric about the central axis 22. The flange 108 extends radially outward from the upper body 94 generally perpendicular to the central axis 22 and, as explained below with reference to FIG. 3, may include structures for securing the precombustion chamber 12 to the cylinder head 18. The seal 112 may be an O-ring or other appropriate type of seal that seals coolant within the cavity 46 of the head 18 (FIG. 1). The upper cavity 120 generally defines a hemispherical volume but, in other embodiments, may generally correspond to other shapes, e.g., a segment of a sphere that is greater than or less than a hemisphere, a segment of an ellipsoid, or some other shape. The upper cavity 120 is in fluid communication with a generally right circular-cylindrical volume 122 that houses an electrode 124 of the sparkplug 102.

In this embodiment, the upper cavity 120 is placed in fluid communication with a downstream side of the fuel valve 120 by the passage 122. The passage 122 may define a generally right circular-cylindrical volume that is angled with respect to the central axis 22. As explained below, the passage 122 may be generally tangential to the surface of the precombustion chamber 12 including the upper cavity 120, and this angular relationship may tend to enhance mixing of fuel and air within the precombustion chamber 12.

The illustrated lower body 96 includes a lower cavity 126, an upper shoulder 128, a flange 130, a chamfer 132, a lower shoulder 134, a passage 136 to the main combustion chamber 56, a sidewall 138, and a dome 140. The flange 130 and shoulder 128 are configured to abut and overlap both the flange 118 and the shoulder 116 of the upper body 94. In this embodiment, a weld 142 joins the chamfer 132 on the lower body 96 to the chamfer 114 on the upper body 94. The illustrated upper body 94 and lower body 96 are cast and then machined separately before being joined permanently by the weld 142. In other embodiments, these components 94 and 96 may be separable and joined with other features, e.g., a threaded connection or bolts. The lower shoulder 134 is generally perpendicular to the central axis 22 (FIG. 1) and abuts the seal 98. The sidewall 138 may define a generally right circular-cylindrical volume and may be generally concentric about the central axis 22. The illustrated dome 140 generally defines a segment of a sphere, e.g., a segment less than a hemisphere, but in other embodiments may have other shapes, such as a flat surface, a portion of an ellipsoid, or a faceted surface (which is not to suggest that a faceted surface may not also generally define a segment of a sphere or other curved shape).

The passage 136, in this embodiment, includes a primary passage 144 and a plurality of secondary passages 146. One end of the primary passage 144 joins with the lower cavity 126, and the other end of the primary passage 144 joins with each of the plurality of secondary passages 146. The illustrated primary passage 144 is generally tangential to the surface of the lower cavity 126, forming an angle 152 that is described below.

The primary passage 144 may join the secondary passages 146 at an area that generally lies along the central axis 22, and the secondary passages 146 may be generally rotationally symmetric about the central axis 22. In this embodiment, the secondary passages 146 are at an angle 148 with respect to the central axis 22, which may be between 0 and 110 degrees, e.g., between 10 and 80 degrees. In other embodiments, the secondary passages 146 may extend in other directions, e.g., generally perpendicular to the central axis 22, radially outward. Both the primary passage 144 and the secondary passages 146 are generally straight, but in other embodiments, they may curve or bend. Both the primary passage 144 and the secondary passages 146 generally define right circular-cylindrical volumes, but in other embodiments, they may generally define other shapes, e.g., a non-right circular-cylindrical volume, an elliptical-cylindrical volume, or a rectangular cylindrical volume. Additional details of the secondary passages 146 are described below with reference to FIG. 3.

The lower cavity 126 generally defines a hemispherical volume. In other embodiments, though, the lower cavity 126, like the upper cavity 120 may have other shapes. Together, the lower cavity 126 and the upper cavity 120 generally define a secondary combustion chamber 150 with a generally spherical shape.

As mentioned above, the passages 122 and 136 are generally tangent to the walls of the secondary combustion chamber 150 to establish a swirling flow within the secondary combustion chamber 150. In some embodiments, the primary passage 144 may approach the lower chamber 126 at an angle 152 that is greater than 115 degrees, e.g., an angle greater than or generally equal to 155 degrees. Similarly, the passage 122 may approach the walls of the secondary combustion chamber 150 at an angle 154 that is greater than 115 degrees, e.g., an angle greater than or generally equal to 155 degrees. As explained below, the angled passages 122 and 144 are believed to establish a swirling motion within the secondary combustion chamber 150 as fuel flows through the passage 122 and as air flows in through the passage 136.

In this embodiment, the passages 122 and 144 are generally coplanar, lying generally in the plane corresponding to the section of FIG. 2, but another embodiments, they may be angled differently to establish a different flow pattern, e.g., a spiral flow pattern. In some embodiments, flow within the secondary combustion chamber 150 may rotate about one axis, e.g., an axis that generally perpendicular to both the view of FIG. 2 and the central axis 22, or more than one axis (in a spiral), e.g. both the central axis 22 and an axis that is generally perpendicular to the central axis 22.

The seal 98 is a generally annular member configured to seal the main combustion chamber 56 from the cavity 46 in the head 18. In this embodiment, the seal 98 is disposed around the walls 138 and against the shoulder 134.

The fuel valve 100 includes a fuel inlet 156 configured to connect to the precombustion chamber 12 to a fuel source. In this embodiment, the fuel valve 100 is a check valve that allows fuel to flow into the secondary combustion chamber 150 and impedes fluid from flowing the other way.

Figure 3:
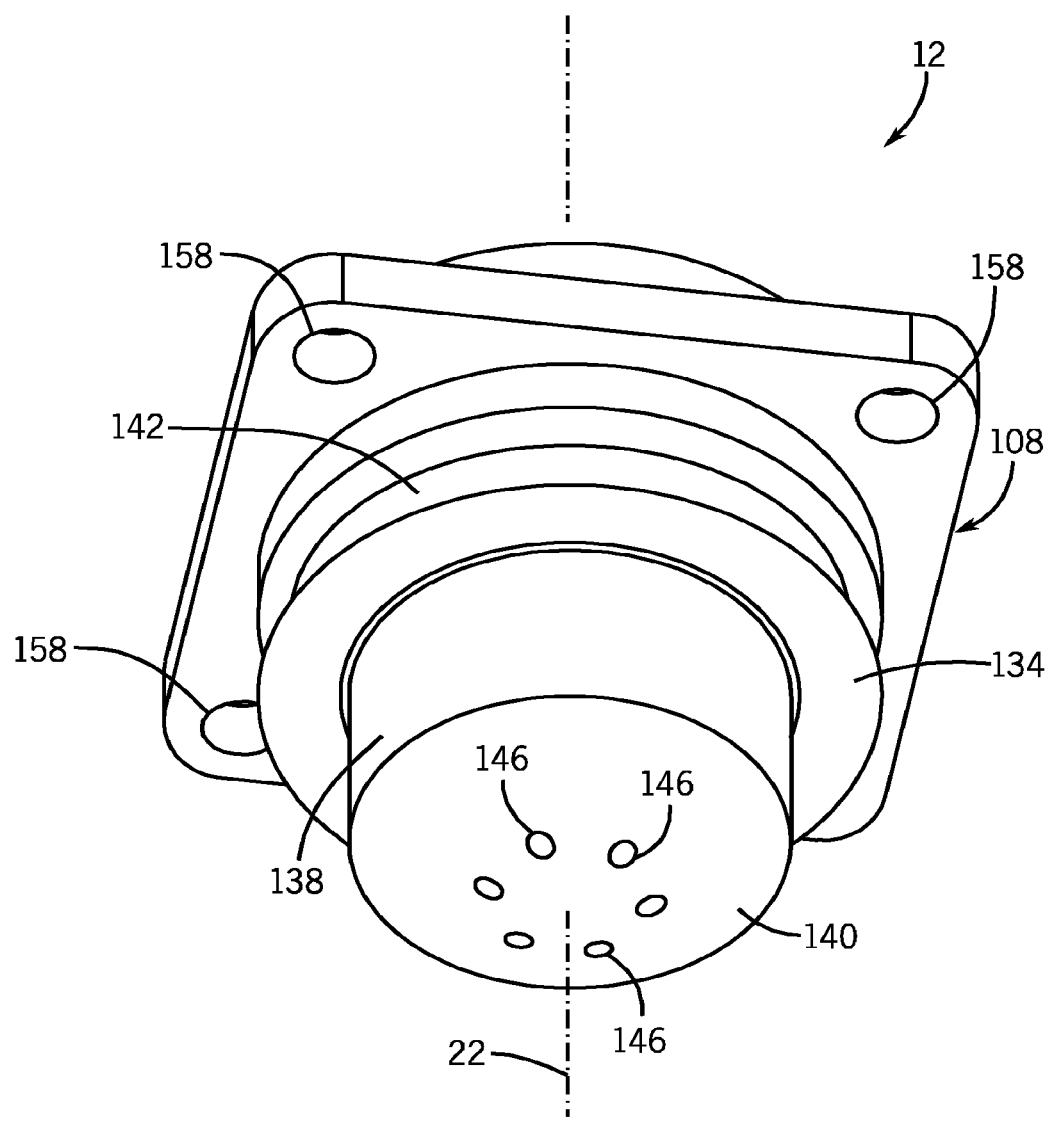
FIG. 3 is a perspective view of the precombustion chamber of FIGS. 1 and 2.

FIG. 3 illustrates a perspective view of the precombustion chamber 12. As illustrated, in this embodiment, the features of the precombustion chamber 12 are generally concentric about the central axis 22 except the flange 108. The flange 108 defines a generally cuboid volume with chamfered corners. Apertures 158 may be disposed in each of the corners for receiving bolts that secure the precombustion chamber 12 to the head 18. In this embodiment, the precombustion chamber 12 is secured to the head 18 without directly threading the precombustion chamber 12 itself to the head 18. Bolts extending through the apertures 158 bias the shoulder 134 against the head 18 and restrict movement of the precombustion chamber 12 relative to the head 18.

FIG. 3 also illustrates aspects of the secondary passages 146. In this embodiment, the precombustion chamber 12 includes six secondary passages 146. In other embodiments, the precombustion chamber 12 may include more or fewer secondary passages 146, e.g. more than 2, 3, 4, or 5 secondary passages 146. The secondary passages 146 are generally evenly radially distributed around the central axis 122 at approximately 60 degree intervals. Other embodiments may include additional secondary passages 146 that are at different angles with respect to the central axis 22, e.g., a secondary passage 146 that is generally coaxial with the central axis 22 and another set of secondary passages 146 that are at a larger angle 148 (FIG. 2) relative to the central axis 22 than the illustrated central passages 146. In some embodiments, the secondary passages 146 may exit the dome 140 at a several different angles with respect to the central axis 22. Further, the passages 146 may have varying diameters or shapes. For instance, passages 146 at a larger angle relative to the central axis 22 may have a larger diameter than passages 146 at a smaller angle.

Figure 4:
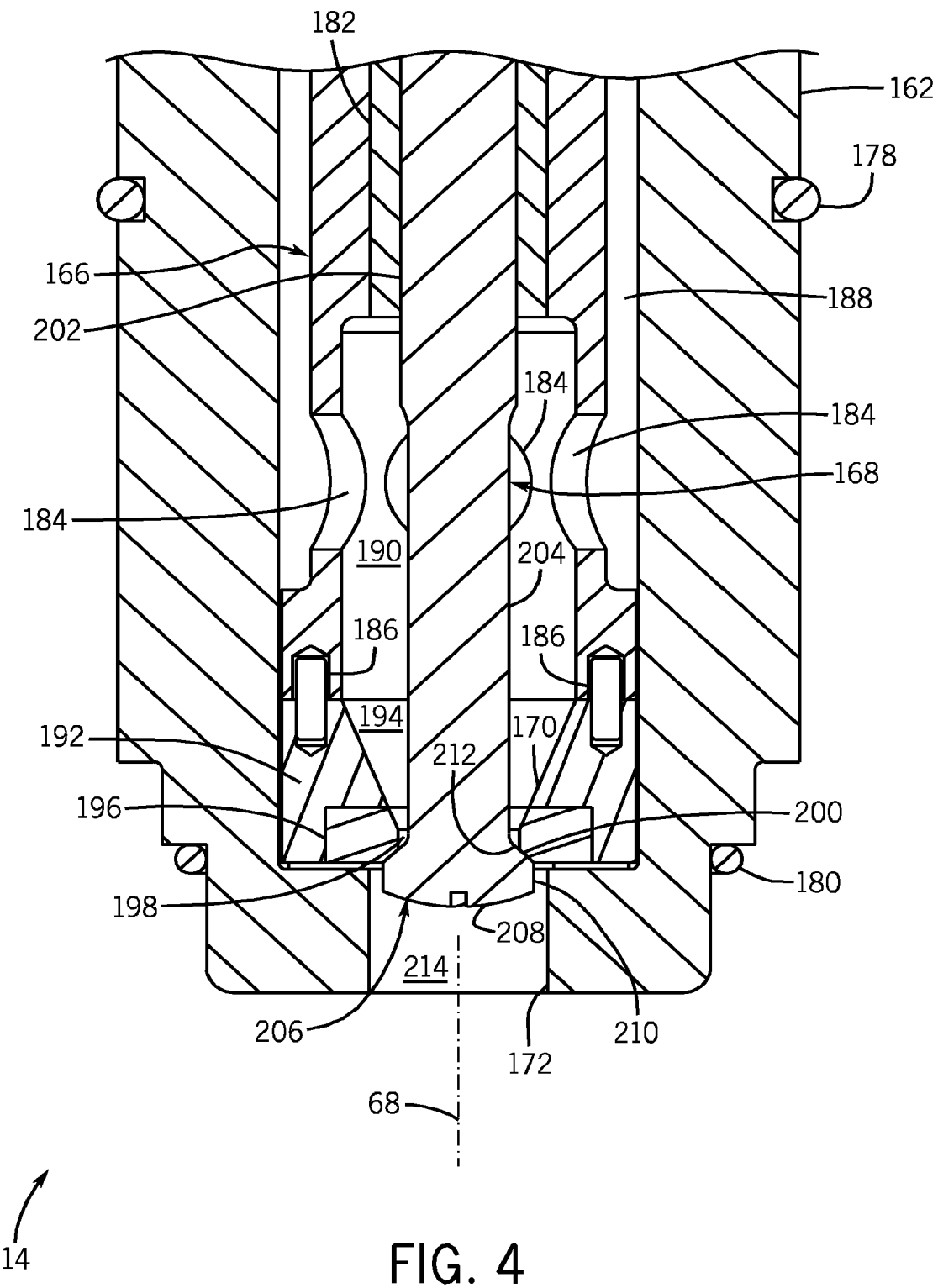
FIGS. 4 and 5 are cross-section views of a gas injection valve in the engine of FIG. 1, illustrating the valve in the open and the closed position.
Figure 5:
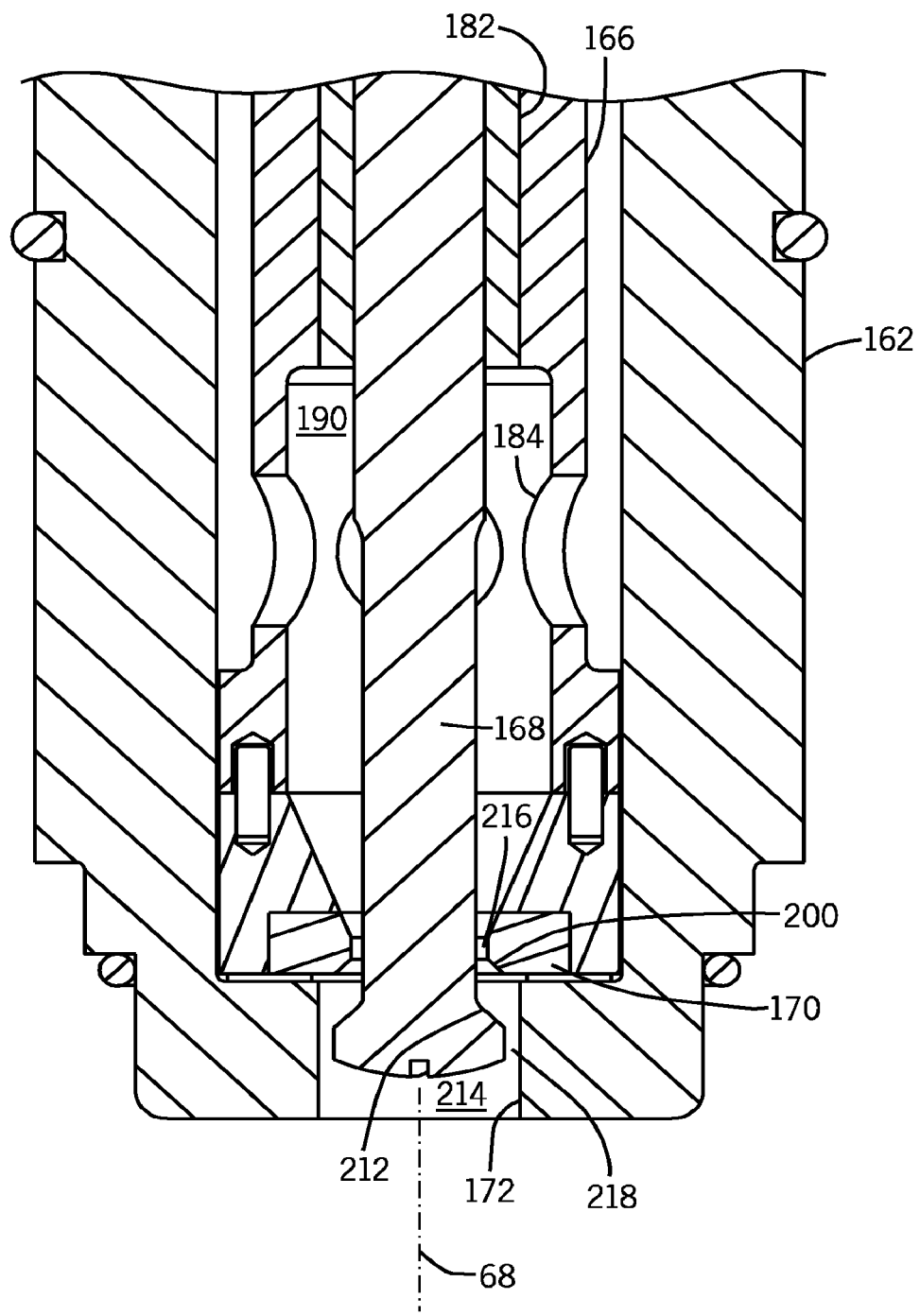

The gas injection valve 14 is illustrated by FIGS. 1, 4, and 5. As depicted by FIG. 1, the gas injection valve 14 may include an actuator 160, a body 162, a spring 164, a sleeve 166, a valve member 168, a seat 170, and a nozzle 172. The actuator 160 couples to the body 162 and includes a rod 174 that selectively biases the valve member 168 to open the gas injection valve 14. The actuator 160 may be mechanically, electrically, hydraulically, or pneumatically actuated, for example. The illustrated body 162 is generally concentric about the axis 68 and extends through the apertures 66 and 64 to place the nozzle 172 in fluid communication with the main combustion chamber 56. The body 162 includes a fuel inlet 176 that receives the primary fuel flow that powers the engine 10. The spring 164, in this embodiment, is a generally-helical compression spring configured to bias the valve member 168 against the seat 170, away from the main combustion chamber 56.

Other features of the gas injection valve 14 are illustrated in greater detail by FIG. 4. In this embodiment, the body 162 includes seals 178 and 180 (e.g., generally annular seals) for sealing coolant in the chamber 46 in the head 18, and the portion of the body 162, between the seals 178 and 180 may be cooled by contact with coolant. The sleeve 166 includes a bushing 182 apertures 184, and threaded recesses 186. In the illustrated embodiment, the bushing 182 is a generally tubular member of that forms a sliding seal with the valve member 168. The sleeve 166 generally defines a tubular outer volume 188 that wraps around the sleeve 166 and an inner volume 190 that is in fluid communication with the outer volume 188 through the apertures 184. The sleeve 166 also includes an upstream nozzle 192 with a chamfered surface that generally defines a frustoconical volume 194. The illustrated valve seat 170 is disposed in a generally annular recess 196 in the upstream nozzle 192. The valve seat 170 continues the sloped surface that defines the generally frustoconical volume 194 and then transitions to a generally right circular cylindrical portion 198. The downstream side of the seat 170 includes a contact surface 200 that is chamfered to define a generally frustoconical volume that expands in the direction of fuel flow.

In this embodiment, the valve member 168 is generally concentric about the axis 68. The valve member 168 day includes a broader right circular cylindrical portion 202 that seals against the bushing 182, a narrower generally right circular cylindrical portion 204, and a head 206. The illustrated head 206 includes a generally dome shaped downstream face 208, generally right circular cylindrical sidewalls 210 and a contact surface 212. The sidewalls 210 are inwardly spaced away from the edges of the nozzle 172 to define a generally annular volume through which fuel flows when the gas injection valve 14 is opened. The contact surface 212 defines a generally frustoconical volume and is generally complementary to the contact surface 200 on the seat 170.

The illustrated nozzle 172 is integrally formed with the body 162, but in other embodiments, the nozzle 172 may be a separate component that is coupled, e.g. threaded or welded, to the body 162. The presently described nozzle 172 overlaps the seat 170 and generally defines a right circular-cylindrical volume 214 that shapes the jet of fuel leaving the gas injection valve 14, as explained below with reference to FIG. 6. In other embodiments, the nozzle 172 may have other shapes, e.g., it may define a generally frustoconical volume with a smaller or larger downstream opening.

FIG. 4 illustrates the gas injection valve 14 in the closed position, and FIG. 5 illustrates the gas injection valve 14 in the open position. To open the gas injection valve 14, in this embodiment, the actuator 160 biases the rod 174 against the valve member 168. This causes the valve member 168 to translate through the bushing 182 and compresses the spring 164. The movement of the valve member 168 shifts the contact surfaces 212 and 200 away from one another and opens a flow path around the valve member 168. As a result, fuel flows in through the fuel inlet 176, around the sleeve 166, through the cavity 188, and into the inner volume 190 through the apertures 184. From the inner volume 190, the fuel flow is focused by the upstream nozzle 192 into a generally annular volume 216 between the seat 170 and the valve member 168. The flow then expands through the generally frustoconical volume defined by the contact surface 200 before flowing through another generally annular volume 218 defined by the space between the valve member 168 and the nozzle 172. The flow then passes into the volume 214 and is focused by the nozzle 172 into a jet that is generally aligned with the axis 68. This jet is described further below with reference to FIG. 6.

Figure 6:
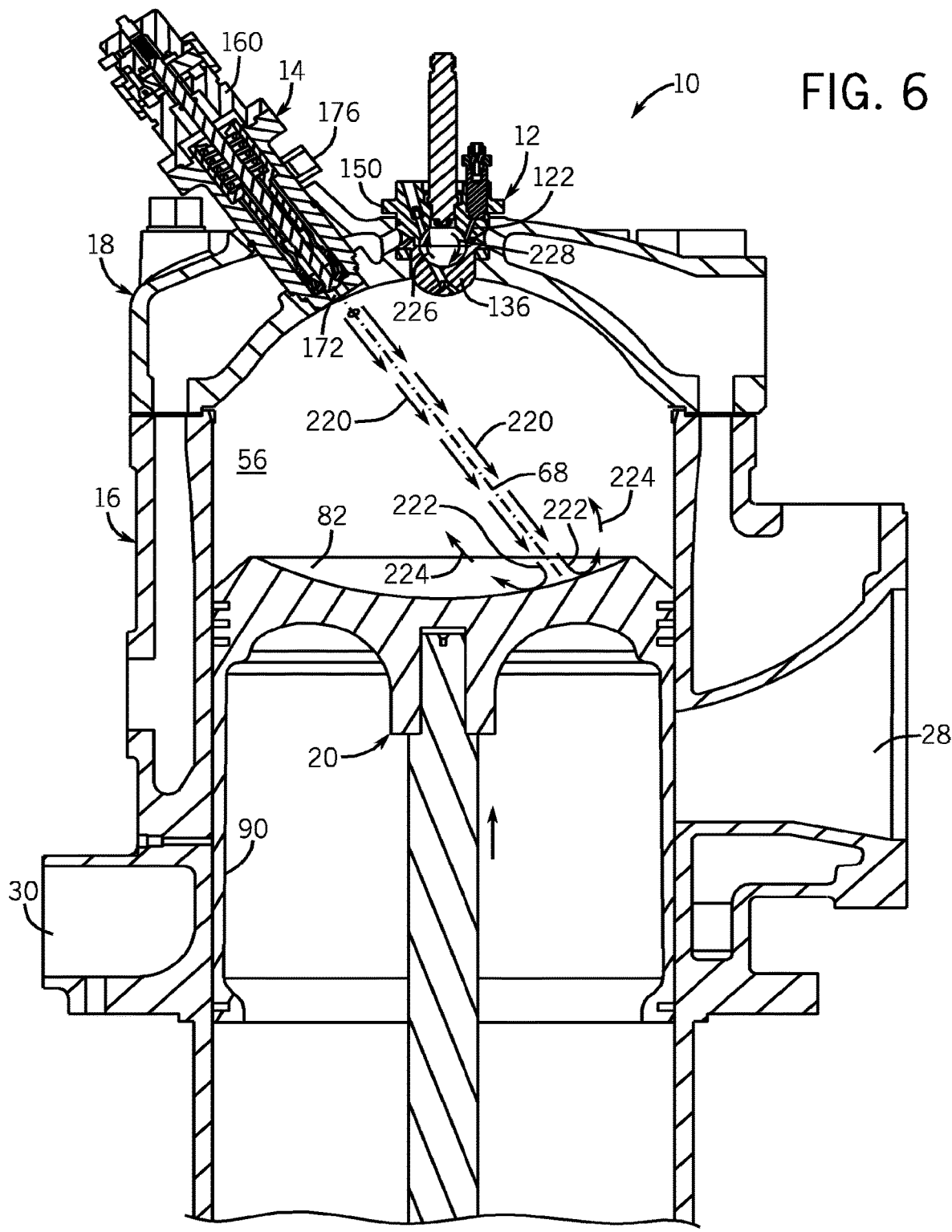
FIG. 6 illustrates the engine of FIG. 1 midway through a compression stroke.

FIG. 6 illustrates the engine in a different part of its cycle from the state illustrated by FIG. 1, which as mentioned above, illustrates the engine 10 near bottom dead center. FIG. 6 illustrates the engine 10 while the piston 20 is midway through a compression stroke. During a compression stroke, the sleeve 90 obstructs both the air inlet 30 and the exhaust outlet 28, and the piston 20 translates toward the head 18, elevating the pressure in the main combustion chamber 56. As the piston 20 translates through the cylinder 16, the actuator 160 opens the gas injection valve 14, causing fuel to flow along the path through the gas injection valve 14 described above with reference to FIG. 5. A jet of fuel leaves the nozzle 172 along a path that extends along the axis 68, as illustrated by arrows 220. This jet crosses through the main combustion chamber 56 and impinges upon the dome-shaped portion 82 of the crown 79 of the piston 20, as illustrated by arrows 222. The jet of fuel then disperses throughout the main combustion chamber 56, as illustrated by arrows 224, and mixes with the air in the cylinder 16. Impinging the jet of fuel on the piston 20 is believed to enhance mixing of the air and fuel, which is believed to increase engine efficiency and lower engine emissions.

FIG. 6 also illustrates aspects of the operation of the precombustion chamber 12. As the pressure in the main combustion chamber 56 rises, air from the main combustion chamber 56 flows into the precombustion chamber 12 through the passage 136. The airflow enters the secondary combustion chamber 150 generally tangent to the walls of the secondary combustion chamber 150 and establishes a swirling motion, as illustrated by arrow 226. Similarly, fuel flows into the secondary combustion chamber 150 through the passage 122 generally tangent to the surface of the secondary combustion chamber 150 and contributes to the swirling motion, as illustrated by arrow 228. This swirling flow may be generally laminar, and it is believed to mix the fuel and the air, enhancing combustion within the chamber 150, increasing engine efficiency, and lowering engine emissions.

FIG. 7 illustrates the engine 10 with the piston 20 near top dead center. At this stage in the engine's cycle, the main combustion chamber 56 is charged with a compressed fuel-air mixture. In some embodiments, the pressure in the main combustion chamber 56 is between 50 and 300 psi, e.g., between 150 and 200 psi. The precombustion chamber 12 ignites this fuel-air mixture by initiating combustion within the chamber 150. The electrode 124 of the sparkplug 102 creates a spark, causing the fuel-air mixture within the secondary combustion chamber 150 to combust. A flame from this combustion expands out of the chamber 150 through the passage 136. The flame is divided among the secondary passages 146 before exiting the precombustion chamber 12 into the main combustion chamber 56. Each of the secondary passages 146 directs a jet of flame and hot gases in a different direction within the main combustion chamber 56, as illustrated by arrows 230. The jets of hot gas and flame ignite the fuel air mixture in the main combustion chamber 56 as they progresses toward the piston 20, resulting in generally simultaneous ignition over a larger volume than is provided by a single jet. In some embodiments, the jets 230 may be generally normal to the dome-shaped portion 80 of the crown of the piston 20 when the piston 20 is at top dead center.

In some embodiments, the air-fuel mixture in the secondary combustion chamber 150 is richer than the air-fuel mixture in the main combustion chamber 56. For example, the fuel-air mixture in the secondary combustion chamber 150 may be between 10 to 1 (air to fuel by mass) and 20 to 1, e.g., between 14 to 1 and 17 to 1, and the fuel-air mixture in the main combustion chamber 56 may between 15 to 1 and 25 to 1, e.g., between 17 to 1 and 21 to 1.

At least two aspects of the illustrated precombustion chamber 12 are believed to contribute to more uniform combustion and more complete combustion within the main combustion chamber 56. Because the precombustion chamber 12 is generally centrally located along the central axis 22, the flame leaving the precombustion chamber 12 is disposed relatively close to substantially all of the volume of the main combustion chamber 56. As a result, in some embodiments, as the flame propagates from the precombustion chamber 12, the flame reaches substantially all of the main combustion chamber 56 within a relatively short period of time, before the flame cools. This is believed to produce more complete combustion and improve engine efficiency relative to some conventional designs. Additionally, the plurality of secondary passages 46 disperses the flame from the precombustion chamber 12 within the main combustion chamber 56. This dispersion is believed to produce a more uniform flame front as combustion propagates throughout the main combustion chamber 56. As a result, the flame does not cool substantially before reaching substantially all of the main combustion chamber 56, and substantially all of the air fuel mixture within the main combustion chamber 56 is ignited within a relatively short period of time. This also is believed to reduce emissions and increase efficiency of the engine 10.

Figure 8:
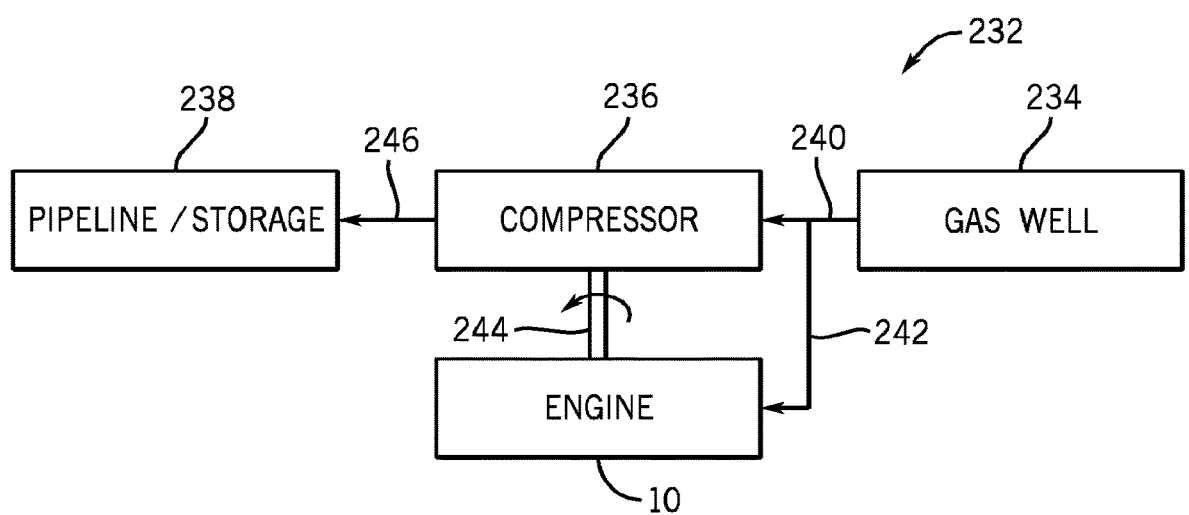
FIG. 8 illustrates a gas-compression system that includes the engine of FIG. 1.

FIG. 8 illustrates an example of a compression system 232 that includes the engine 10 described above. The system 232 includes a natural-gas well 234, the engine 10, a compressor 236, and a pipeline, storage, or other fluid destination 238. The gas well 234 may be a subsea or a surface natural gas well. The engine 10 may be a two-stroke combustion engine having between 40 and 1000 hp, e.g., between 100 and 1000 hp.

In operation, natural gas flows from the gas well 234 to the compressor 236, as illustrated by arrow 240. A portion of this flow is diverted to the engine 10, as illustrated by arrow 242. The diverted flow 242 may be conditioned by removing moisture or changing the gas pressure before being introduced to the engine 10. A small portion of the diverted gas 242 flows into the precombustion chamber 12 and the rest of the diverted gas 242 flows into the cylinders of the engine 10. The engine 10 combusts the diverted fuel 242 by igniting the fuel in the precombustion chambers 12, as described above, and drives a shaft 244 or other mechanical or electrical linkage that powers the compressor 236. The compressor 236 compresses the flow 240 from the gas well 234 and produces an outlet flow 246 at a higher pressure.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for use in a two-stroke engine including a spark plug, a fuel valve, and a cylinder defining a main combustion chamber having a central axis, the apparatus comprising:
   a precombustion device configured to be positioned on the cylinder along the central axis of the main combustion chamber, wherein the precombustion device includes:
   a secondary combustion chamber having a spherical shape;
   a sparkplug aperture configured to position an electrode of the sparkplug in fluid communication with the secondary combustion chamber;
   a fuel valve aperture configured to receive the fuel valve;
   a first passage extending from the fuel valve aperture to the secondary combustion chamber, wherein the first passage is configured to direct fuel to enter the secondary combustion chamber in a non-radial direction that does not project across the central axis within the secondary combustion chamber; and
   a second passage configured to extend between the secondary combustion chamber and the main combustion chamber, wherein the second passage includes a primary passage that is open at the secondary combustion chamber, and further includes secondary passages that diverge from the primary passage.

2. An apparatus as defined in claim 1, wherein the non-radial direction is not parallel or orthogonal to the central axis.

3. An apparatus as defined in claim 1, wherein the wherein the primary passage is configured to direct air to enter the secondary combustion chamber in a second non-radial direction that does not project across the central axis within the secondary combustion chamber.

4. An apparatus as defined in claim 3, wherein the second non-radial direction is not parallel or orthogonal to the central axis.

5. An apparatus as defined in claim 1, wherein the precombustion device has first and second adjoining body portions with opposed hemispherical inner surfaces that together define the spherical shape of the secondary combustion chamber.

6. An apparatus as defined in claim 5, wherein the first passage is formed in the first body portion of the precombustion device and the second passage is formed in the second body portion of the precombustion device.

7. An apparatus as defined in claim 6, wherein the spark plug aperture also is formed in the first body portion of the precombustion device.

\* \* \* \* \*